United States Patent
Ye et al.

(10) Patent No.: US 9,531,940 B2
(45) Date of Patent: Dec. 27, 2016

(54) APPARATUS AND METHOD FOR LIQUID CRYSTAL LENS IMAGING

(71) Applicant: SHENZHEN MERCURY OPTOELECTRONICS RESEARCH INSTITUTE, Shenzhen (CN)

(72) Inventors: Mao Ye, Shenzhen (CN); Chunhui Cui, Shenzhen (CN); Rui Bao, Shenzhen (CN); Shuda Yu, Shenzhen (CN)

(73) Assignee: SHENZHEN MERCURY OPTOELECTRONICS RESEARCH INSTITUTE, Shenzhen (CN)

( * ) Notice: Subject to any disclaimer, the term of this patent is extended or adjusted under 35 U.S.C. 154(b) by 0 days.

(21) Appl. No.: 14/581,615

(22) Filed: Dec. 23, 2014

(65) Prior Publication Data

US 2015/0381877 A1 Dec. 31, 2015

(30) Foreign Application Priority Data

Jun. 25, 2014 (CN) .......................... 2014 1 0294382

(51) Int. Cl.
| | |
|---|---|
| *H04N 5/232* | (2006.01) |
| *G02B 13/00* | (2006.01) |
| *H04N 5/217* | (2011.01) |
| *H04N 5/225* | (2006.01) |

(52) U.S. Cl.
CPC ...... *H04N 5/23212* (2013.01); *G02B 13/0075* (2013.01); *H04N 5/217* (2013.01); *H04N 5/2254* (2013.01)

(58) Field of Classification Search
CPC ......... G02B 3/12; G02B 3/14; G02B 13/0075; H04N 5/23212; H04N 5/217; H04N 5/2254
See application file for complete search history.

(56) References Cited

U.S. PATENT DOCUMENTS

| | | | |
|---|---|---|---|
| 2012/0057070 A1* | 3/2012 | Park | H04N 5/23212 348/345 |
| 2013/0113889 A1* | 5/2013 | Chen | H04N 5/2257 348/47 |
| 2014/0009572 A1* | 1/2014 | Matsumoto | H04N 5/23238 348/36 |

FOREIGN PATENT DOCUMENTS

| | | |
|---|---|---|
| CN | 103728808 A | 4/2014 |
| WO | 2011096157 A1 | 8/2011 |
| WO | 2014045913 A1 | 3/2014 |

\* cited by examiner

*Primary Examiner* — Mekonnen Dagnew
(74) *Attorney, Agent, or Firm* — Anova Law Group, PLLC

(57) ABSTRACT

A liquid crystal lens imaging apparatus includes a lens group containing at least a liquid crystal lens, a drive circuit, an image collecting unit, and an image processing unit. The drive circuit is connected to the liquid crystal lens to drive the liquid crystal lens into an out-of-focus state or into an in-focus state. The image collecting unit is configured to collect light signal passing through the liquid crystal lens and to generate an image according to the light signal. When the liquid crystal lens is in the in-focus state, the image collecting unit generates an in-focus image of the light signal and, when the liquid crystal lens is in the out-of-focus state, the image collecting unit generates an out-of-focus image of the light signal. Further, the image processing unit is connected to the image collecting unit to receive both the in-focus image and the out-of-focus image and to process the in-focus image using the out-of-focus image to obtain a processed in-focus image as a final generated image.

17 Claims, 3 Drawing Sheets

APPARATUS AND METHOD FOR LIQUID CRYSTAL LENS IMAGING

CROSS-REFERENCES TO RELATED APPLICATIONS

This application claims priority of Chinese Patent Application No. 201410294382.3, filed on Jun. 25, 2014, the entire contents of which are incorporated by reference herein.

FIELD OF THE INVENTION

The present invention generally relates to the field of lens imaging technology and, more particularly, to a liquid crystal lens imaging apparatus and method.

BACKGROUND

Due to the anisotropic characteristics of liquid crystal material, a liquid crystal device usually only responds to polarized light. So when a crystal liquid lens is used in an imaging device, a polarizing device such as a polarizing plate or a polarizer is required to polarize the incident light. But the use of the polarizer will lose more than half of the incident light intensity. Thus, in a darker environment, there may not be enough light to reach the image sensor, causing decreased signal to noise ratio and lowered image quality.

To avoid the use of the polarizer, a lens group composed of multiple superimposed liquid crystal lenses with their initial alignment of the liquid crystal layers perpendicular to each other may be used in the imaging system. Or a liquid crystal lens superimposed by multiple liquid crystal layers with their initial alignment perpendicular to each other may be designed for the imaging system. Each liquid crystal lens or each liquid crystal layer processes respectively polarization component of an arbitrary polarization state in two perpendicular directions, thus it can be applied to the situation of arbitrary polarization state. But such solution has the following problems.

For the solution with multiple superimposed liquid crystal lenses or multiple superimposed liquid crystal layers, due to the increased number of the liquid crystal lenses or liquid crystal layers, the manufacturing cost of the liquid crystal lens may be greatly increased. The increased number of liquid crystal lenses or liquid crystal layers may also greatly increase the thickness of the device, making it difficult for the liquid crystal lens imaging apparatus to be implemented into mobile devices such as mobile phones, tablet computers, etc. Moreover, because each liquid crystal lens or each liquid crystal layer is located at different positions in the imaging system, the propagation behavior of the two components of the polarized light is not exactly the same, which may reduce the imaging quality of the system.

The disclosed methods and systems are directed to solve one or more problems set forth above and other problems, including how to directly generate high quality images with the liquid crystal lens without the polarizer and to reduce the thickness of the lens structure at the same time.

BRIEF SUMMARY OF THE DISCLOSURE

One aspect of the present disclosure provides a liquid crystal lens imaging apparatus. The liquid crystal lens imaging apparatus includes a lens group containing at least a liquid crystal lens, a drive circuit, an image collecting unit, and an image processing unit. The drive circuit is connected to the liquid crystal lens to drive the liquid crystal lens into an out-of-focus state or into an in-focus state. The image collecting unit is configured to collect light signal passing through the liquid crystal lens and to generate an image according to the light signal. When the liquid crystal lens is in the in-focus state, the image collecting unit generates an in-focus image of the light signal and, when the liquid crystal lens is in the out-of-focus state, the image collecting unit generates an out-of-focus image of the light signal. Furthermore, the image processing unit is connected to the image collecting unit to receive both the in-focus image and the out-of-focus image and to process the in-focus image using the out-of-focus image to obtain a processed high-contrast in-focus image as the final generated image.

Another aspect of the present disclosure provides a liquid crystal lens imaging method. The liquid crystal lens imaging method includes driving a liquid crystal lens respectively into an out-of-focus state or into an in-focus state, and collecting light signal passing through the liquid crystal lens by an image collecting unit to generate an image according to the light signal. When the liquid crystal lens is in the in-focus state, the image collecting unit generates an in-focus image of the light signal and, when the liquid crystal lens is in the out-of-focus state, the image collecting unit generates an out-of-focus image of the light signal. The method also includes receiving both the in-focus image and the out-of-focus image by an image processing unit and processing the in-focus image using the out-of-focus image to obtain a processed in-focus image as a final generated image.

Other aspects of the present disclosure can be understood by those skilled in the art in light of the description, the claims, and the drawings of the present disclosure.

DETAILED DESCRIPTION

In order to make the purposes, features and advantages of the present invention to be more clearly understood, the followings together with accompany drawings describe in detail the present invention with specific embodiments. It should be noted that the embodiments and features of the embodiments according to the present invention may be combined with each other.

In the following descriptions, numerous specific details are set forth in order to fully understand the present invention, but the present invention may also be implemented in other ways different from the disclosed embodiments. Therefore, the present invention is not limited to the specific embodiments disclosed in the following descriptions.

Figure 1:
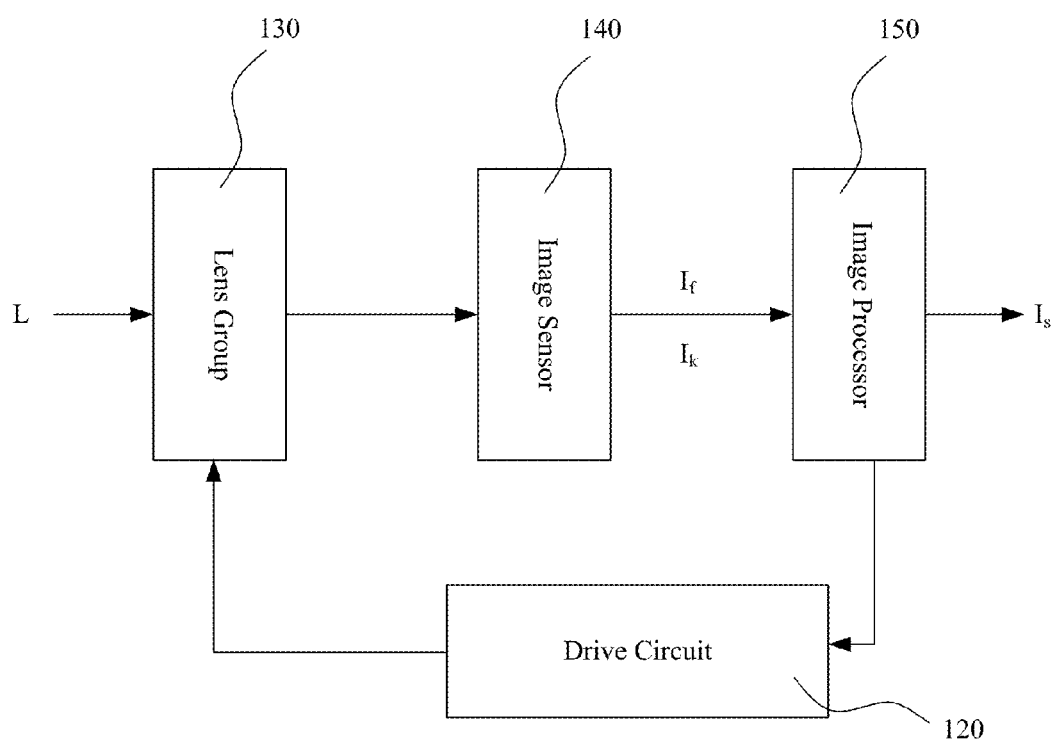
FIG. 1 illustrates a schematic diagram of a liquid crystal lens imaging apparatus according to the disclosed embodiments.

FIG. 1 illustrates a schematic diagram of a liquid crystal lens imaging apparatus according to disclosed embodiments of the present invention. As shown in FIG. 1, the liquid crystal lens imaging apparatus includes a lens group 130, an image sensor (image collecting unit) 140, an image processor (image processing unit) 150 and a drive circuit 120. Other components may also be included.

During operation, the lens group 130 may be configured to process and transmit incident light into the liquid crystal lens imaging apparatus. For example, when an original incident light L (e.g., sunlight, generally including mixed polarized light of non-single-direction polarization) enters the lens group 130, the image sensor 140 collects light signal passing through the lens group 130, generates an image based on the collected light signal and transmits the generated image to the image processor 150. The lens group 130 may include any appropriate devices that can form lens, such as a liquid crystal device(s). The liquid crystal in the liquid crystal device may change states when different voltages are applied on the liquid crystal to form lens with different shapes, focal length, size, etc. The lens group 130 may be a permanent lens or a temporary lens formed by operational conditions, such as voltages.

The image processor 150 receives and analyzes the image, and outputs a control signal to the drive circuit 120 based on the received image. The drive circuit 120 is connected to liquid crystal lenses of the liquid crystal lens group 130. The drive circuit 120 may adjust the voltage applied on the lens group 130 according to the control signal output from the image processor 150 to change the refractive index of the liquid crystal lenses. Thus the liquid crystal lenses may transit from an out-of-focus state to an in-focus state, or vice versa from the in-focus state to the out-of-focus state. When the liquid crystal lenses are in the in-focus state, the image sensor 140 generates an in-focus image. During a transition from the out-of-focus state to the in-focus state or from the in-focus state to the out-of-focus state, the image sensor 140 generates at least one out-of-focus image.

The image processor 150 may be configured to receive the in-focus and out-of-focus images, to use the out-of-focus images to reduce the interference signal not modulated by the liquid crystal lenses in the in-focus image, and to increase the proportion of the light component modulated by the liquid crystal lenses. Eventually, the image processor 150 may restore and obtain a clear and sharp image. Thus, the imaging system according to the present invention can generate a final clear high-contrast in-focus image with the help of the out-of-focus images.

In certain embodiments, the lens group 130 may include at least a liquid crystal lens. When the lens group 130 includes multiple liquid crystal lenses, initial alignments of the multiple liquid crystal lenses may be parallel to each other, i.e. the rubbing directions of the alignment layers of the multiple liquid crystal lenses are parallel to each other. In addition to the liquid crystal lenses, the lens group 130 may also include other physical optical lenses, such as glass or plastic optical lenses.

Further, the lens group 130 may be implemented in different embodiments by a variety of combinations and compositions, including, but not limited to, any one or more or a combination of the followings: (1) a single crystal liquid lens; (2) a compound-eye array comprising single liquid crystal lenses; (3) multiple liquid crystal lenses with their initial alignments parallel to each other; (4) multiple liquid crystal lenses with their initial alignments parallel to each other or a compound-eye array thereof; (5) a combination of a single liquid crystal lens and other optical lenses; (6) a combination of the compound-eye array composed of single liquid crystal lenses and other optical lenses; (7) multiple liquid crystal lenses with their initial alignments parallel to each other and other optical lenses; and (8) multiple liquid crystal lenses with their initial alignments parallel to each other or the compound-eye array thereof and other optical lenses.

As described above, the lens group 130 and the liquid crystal lenses may also be a lens array, but here in the present invention, they are all referred to as the "lens group" and the "liquid crystal lens" without distinction. As functions of the lens group or liquid crystal lens are disclosed in detail, other details of specific implementations of the lens group 130 and the variety of combinations and, compositions, as well as its physical optical lenses, are omitted here.

In certain embodiments, the lens group 130 may include at least a liquid crystal lens and an optical lens coupled with the liquid crystal lens. The liquid crystal lens of the lens group 130 is placed in front of the optical lens, a specific placement may be adjusted in accordance with its own parameters. When the original incident light (e.g., sunlight, typically including mixed polarized light with multiple different polarization directions) reaches the optical lens through the liquid crystal lens, the liquid crystal lens and the optical lens, as a whole, modulates the light signal by converging and diverging the incident light. And the image processor 140 generates the in-focus and out-of-focus images.

In certain embodiments, the image processor 150 may be a programmable logic controller. The image processor 150 may include one or more general processor or graphic processor. The image processor 150 may also include other component, such as a storage medium, a display, a communication module, a database, and/or peripherals, etc. Further, the one or more processor can include multiple cores for multi-thread or parallel processing. Storage medium may include memory modules, such as ROM, RAM, flash memory modules, and mass storages, such as CD-ROM and hard disk, etc. Storage medium may store computer programs for implementing various image processing functions, when the computer programs are executed by the processor (i.e., the image processor 150). The peripherals may include various sensors and other I/O devices, such as keyboard and mouse, and communication module may include certain network interface devices for establishing connections through communication networks. Database may include one or more databases for storing certain data and for performing certain operations on the stored data, such as database searching.

In general, when without a polarizing device, such as a polarizing plate or a polarizer, after the original incident light L (e.g., mixed polarized light of non-single-direction polarization) passes through the liquid crystal lenses, in addition to the polarized light component modulated by the liquid crystal lenses, the passed-through incident light L may also include other mixed polarized light components unmodulated by the liquid crystal lenses, which may cause decreased clarity for the final generated image. To solve such problem, the liquid crystal lens imaging apparatus according to the disclosed embodiments, in addition to capturing or obtaining the stable in-focus image, may also capture or obtain one or multiple out-of-focus images, and processes the in-focus image using the out-of-focus images to eventually restore a clear and sharp image especially when without using the polarizing device.

Moreover, especially when without using the polarizing device, the liquid crystal lens imaging apparatus according to the disclosed embodiments may preserve or ensure the light intensity of the original incident light L. Thus even in low-light condition, the image sensors may also be able to distinguish the details, enhancing the shooting effect in dark ambient light and further enriching the details of a captured image. Further, comparing to an optical imaging system constituted by the lens (group) composed of multiple superimposed liquid crystal lenses with their initial alignments perpendicular to each other or multiple superimposed liquid crystal layers, the liquid crystal lens imaging apparatus according to the disclosed embodiments of the present invention can be made thinner and lighter, and is more suitable for mobile devices such as mobile phones, tablet computers, etc.

The above describes the structure of main components of the liquid crystal lens imaging apparatus according to the present invention and its general operation process. The followings describe in detail the operation principle of the liquid crystal lens imaging apparatus according to the schematic diagram of the liquid crystal lens imaging apparatus shown in FIG. 1. For example, the processing of the in-focus image through the use of the generated out-of-focus images may be described first.

When the lens group 130 is in operation, the liquid crystal lenses is driven to a lens state to tune the focus. At the beginning of focusing, the liquid crystal lenses are still in an out-of-focus state, so the image sensor 140 generates or captures out-of-focus images. The image processor 150 receives and analyzes the out-of-focus images.

When it is determined that the generated or captured image is the out-of-focus image, the image processor 150 outputs a control signal to the drive circuit 120. According to the control signal, the drive circuit 120 adjusts the voltage applied on the liquid crystal lenses to continue tune the focus, and to transit the liquid crystal lenses from the out-of-focus state to the in-focus state.

After repeated adjustments until the image sensor 140 generates the in-focus image, the image processor 150 receives the in-focus image and an imaging process is completed. A next imaging process can be started. During the transition from the out-of-focus state to the in-focus state, the image sensor 140 generates at least one out-of-focus image. Therefore, the image processor 150 receives the out-of-focus images and processes the in-focus image to restore or recover a clear and sharp image. The following describes in detail various embodiments of the liquid crystal lens imaging apparatus.

Embodiment One

Without loss of generality, the original incident light L may have multiple different polarization directions. According to the characteristics of the liquid crystal lenses that the liquid crystal lenses only respond to polarized light, all the light components of the original incident light L which can be modulated by the liquid crystal lenses are decomposed into one polarization direction, and all the light components which cannot be modulated by the liquid crystal lenses are decomposed into another polarization direction, and the two polarization directions, represented respectively as x and y, are perpendicular to each other.

The light components of the light signal (the original incident light L) received by the image processor 140 on polarization directions x and y generate two images, represented respectively as $I^x$ and $I^y$. That is, an image captured and generated by the image sensor 140 can be represented by two component sub-images, as $I^x$ and $I^y$, respectively. It should be noted that the meaning of x and y in present invention is different from the meaning of the coordinates x and y in an image. Not like the coordinates x and y, the x and y in the present invention can be any two perpendicular directions.

Thus, when the drive circuit 120 controls the liquid crystal lenses of the lens group 130 to transit from out-of-focus state to in-focus state, the image sensor 140 captures and generates an out-of-focus image $I_k$, which can be expressed by two component sub-images $I_k^x$ and $I_k^y$ in the following equation:

$$I_k = I_k^x + I_k^y \quad (1)$$

That is, the out-of-focus image $I_k$ includes the image $I_k^x$ and $I_k^y$ generated respectively by the light components in polarization direction x and y of the light signal received by the image sensor 140, wherein the light signal in polarization direction y is also known as the interference light signal.

When the liquid crystal lenses of the lens group 130 are in a stable in-focus state under the control of the drive circuit 120, the image sensor 140 captures and generates an in-focus image $I_f$, which can also be expressed by two component sub-images $I_f^x$ and $I_f^y$ in the following equation:

$$I_f = I_f^x + I_f^y \quad (2)$$

That is, the in-focus image $I_f$ includes the image $I_f^x$ and $I_f^y$ generated by the light components in polarization direction x and y of the light signal received by the image sensor 140. The light signal in polarization direction y is also known as the interference light signal. Of course, the in-focus image $I_f$ can also be generated first and the out-of-focus image $I_k$ can be generated afterward.

Further, when the lens group 130 is not in operation, the liquid crystal lenses are in out-of-focus state, and the drive circuit 120 does not apply driving voltage on the liquid crystal lenses. So the liquid crystal lenses does not have modulation effect on the original incident light L. Since the liquid crystal lens imaging apparatus does not use the polarizing device such as polarizing plate or polarizer, the x component and y component of the original incident light L can pass the liquid crystal lenses without any changes.

When the lens group 130 is in operation, the drive circuit 120 applies driving voltage on the liquid crystal lenses to render the liquid crystal lenses in lens state, and the polarized light modulated by the liquid crystal lenses generates the image on the image sensor 140. The liquid crystal lenses only have modulation effect on the light signal in polarization direction x of the original incident light L by converging and diverging the light, and the light signal on the perpendicular polarization direction y can pass through the lens group 130 without being modulated.

By using the out-of-focus image $I_k$ generated during the focusing process, the in-focus image $I_f$ is processed based on the following equation to obtain a final clear image $I_s$:

$$I_s = I_f - wI_k = I_f^x + I_f^y - wI_k^x - wI_k^y \quad (3),$$

where w represents a weighting coefficient.

As long as the liquid crystal lenses respond to the voltage quickly enough, the transition time from the out-of-focus state corresponding to the out-of-focus image $I_k$ to the in-focus state corresponding to the in-focus image $I_f$ is short enough, i.e., a time interval between the out-of-focus state and the in-focus state is less than a preset time. Thus, a shooting scene does not change significantly (e.g., change on the light intensity, the movement of objects in the scene, and the movement of the imaging apparatus, etc.). Thus, it is reasonable to assume that there is no change occurred for the original incident light L in the two states (out-of-focus state and in-focus state), or the change occurred is small enough to be ignored. And for $I_k^y$ and $I_f^y$, since the liquid crystal lenses do not have modulation effect on the light component in polarization direction y in the two states, so the following equation can be obtained:

$$I_f^y = I_k^y \quad (4)$$

Therefore, the equation (3) can be converted to the following equation:

$$I_s = (I_f^x - w I_k^x) + (1-w) I_f^y \quad (5)$$

For a particular focal plane, $I_f^x$ also represents a clear in-focus image and $I_k^x$ represents a blur out-of-focused image. Then $(I_f^x - w I_k^x)$ indicates the use of the sub-image $I_k^x$ generated by the light signal of the out-of-focus image $I_k$ unmodulated through the liquid crystal lenses to process the sub-image $I_f^x$ generated by the light signal of the in-focus image $I_f$ modulated through the liquid crystal lenses. It is equivalent to a high-pass filtering process, i.e. an Unsharp Masking process, on the clear image $I_f^x$ to further sharpen the clear image $I_f^x$ to a higher contrast. In other word, $(I_f^x - w I_k^x)$ indicates a more clear image than the in-focus image $I_f^x$, and $(1-w) I_f^y$ indicates an image generated by attenuated interference light signal with its energy reduced to $(1-w)$ of its original energy. That is, the interference caused by the lack of the polarizer can be effectively removed by using the out-of-focus image.

The w represents a weighting coefficient of the out-of-focus image $I_k$, with its value greater than 0 and less than 1 ($0 < w < 1$). The w cannot be equal to 1 ($w \neq 1$). Because, when w equals to 1 ($w=1$), although the image $I_f^y$ generated by the interferece light signal can be completely removed, and $(I_f^x - w I_k^x)$ can also achieve the best sharpening effect, but the final signal energy tends to be zero, therefore it does not have any practical significance.

Further, the image can be further processed after processed according to equation (5), which is to enhance the brightness, so the energy of the image can be restored to its normal level. As an example, the brightness of the image is linearly adjusted based on the following equation, and the processed image is expressed as:

$$I_s' = \alpha I_s = \alpha (I_f - w I_k) \quad (6)$$

where $\alpha$ is a real number greater than 1.

In a traditional liquid crystal lens imaging system, the polarizing device is placed in front of the liquid crystal lenses. Thus, only the light signal polarized in a specific polarization direction can pass through the polarizing device to be converged or diverged by the liquid crystal lenses, the light signal polarized in other polarization directions are all shaded or blocked by the polarizing device, which means that the intensity of the light signal is greatly reduced after passing through the polarizing device.

When the light signal received by the image sensor is very weak, the induced image may also have low intensities, it may occur that the intensity of the received light signal is lower than the intensity of the system noise, resulting in loss of image details when shooting in low light environments. Although the image quality may be partly compensated through post-processing, but the image quality cannot be fully recovered. In addition, the traditional liquid crystal lens imaging system adopts the solution of multiple superimposed liquid crystal lenses especially when without the polarizing device, which increases the thickness of the entire liquid crystal lens imaging system, and does not meet the requirements of lightweight devices.

The liquid crystal lens imaging apparatus according to the present invention does not use the polarizing device, so the light signal after passing through the liquid crystal lenses retains the energy in all polarization directions and the intensity of the light signal does not change. Thus, it is much easier for the image sensor 140 to detect or sense subtle changes of the light signal and to further enrich details of the generated image. And the final clear image generated by the help of the out-of-focus images generated during the focusing process is much sharper and has much higher imaging contrast. In addition, the liquid crystal lens imaging apparatus according to the present invention can be made much thinner and lighter, more suitable for mobile devices such as mobile phones and tablet computers, etc., and can effectively improve shooting effect in low light environments.

Embodiment Two

Different from what described above in Embodiment One, when the drive circuit 120 controls the liquid crystal lenses of the lens group 130 to focus, during the transition from the out-of-focus state to the in-focus state, the image sensor 140 detects and generates multiple out-of-focus images $I_1, I_2, \ldots, I_n$ arranged or ordered according to its length of time interval from the in-focus state, where n is an integer greater than 1.

Under the condition that there is no change occurred for the original incident light L during the focusing process, or the change occurred is minor enough to be ignored, the in-focus image is processed by using the out-of-focus images according to the following equation to obtain the final clear image $I_s$:

$$I_s = \text{normalization}[I_f - \psi(I_1, \ldots, I_n)] \quad (7)$$

Where, normalization is a brightness normalization function, $I_f - \psi(I_1, \ldots, I_n)$ represents that the in-focus image is processed by using at least an out-of-focus image.

In certain embodiments, $\psi(I_1, \ldots, I_n)$ satisfies the following equation:

$$\psi(I_1, \ldots, I_n) = \Sigma_{k=1}^n w_k I_k \quad (8)$$

Where, $w_k$ represents the weighting coefficient of the out-of-focus image $I_k$, and $0 \leq w_k < 1$, $\Sigma_{k=1}^n w_k < 1$.

Comparing to Embodiment One, it can be seen that, among the out-of-focus images, the longest time interval is between the out-of-focus state corresponding to $I_1$ and the in-focus state corresponding to $I_f$, and $I_1$ is the most blurred image. According to equation (5), the image represented by $(I_f - w_1 I_1)$ has the highest image sharpness.

On the other hand, the longer the time interval between the two states is, the higher the possibility of changes occurred for the original incident light L between the two states is. In contrast, the time interval between the two states corresponding to $I_n$ and $I_f$ is the shortest. According to equation (5), even though the image represented by $(I_f - w_n I_n)$ has the lowest sharpness, but the possibility of changes occurred for the original incident light L between the two states is the lowest. Therefore, preferably, $w_k$ increases with the increase of k value.

In an actual image shooting, $w_k$ may be adjusted according to the out-of-focus image $I_k$. Preferably, when shooting a still scene, let $w_k$ with smaller k value take a bigger value. With the gradual increase of k value, let $w_k$ decrease accordingly to obtain a further clear out-of-focus image. Preferably, when shooting a sports scene, let $w_k$ with smaller k value take a smaller value. With the gradual increase of k value, let $w_k$ increase accordingly. Thus, ghost images caused by movement can be reduced.

In certain embodiments, the brightness normalization function normalization[x] satisfies the following equation:

$$\text{normalization}[x] = x / [1 - \Sigma_{k=1}^n w_k] \quad (9)$$

Together with equation (8) and (9), the equation (6) can be converted to the following equation:

$$I_s = [I_f - \Sigma_{k=1}^n w_k I_k]/[1 - \Sigma_{k=1}^n w_k] \quad (10)$$

Based on above analysis, according to disclosed embodiments, since these out-of-focus images $I_1, I_2, \ldots, I_n$ and the in-focus image $I_f$ need to be stored and arithmetically processed, the liquid crystal lens imaging apparatus according to the present invention has higher requirements on the hardware, such as processing power and storage space, etc. And comparing to embodiment one, since the liquid crystal lens imaging apparatus according to the present invention uses a set of out-of-focus images $I_1, I_2, \ldots, I_n$ to process the in-focus image $I_f$, the generated image has the higher contrast.

Embodiment Three

For images with a single focal plane, the images can be processed sufficiently according to the above two embodiments (embodiment one and embodiment two). But in actual image shootings, since different objects are focused in different focal planes, and only a certain focus point can be specified, and objects focused in a same focal plane of the specified focus point can be focused and imaged. Thus, on a same generated image, the objects focused in the focal plane produce a clear image, and other objects focused in other focal planes produce a blur image.

Figure 2:
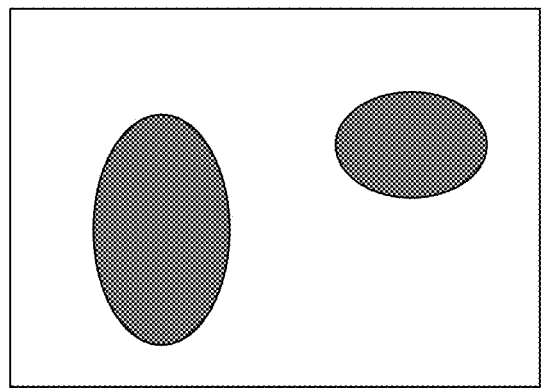
FIG. 2 illustrates an exemplary image with focal image areas and non-focal image areas according to the disclosed embodiments.

As shown in FIG. 2, an image area in the same focal plane of the specified focus point is called a focal image area $S_f$, while an image area outside the focal area $S_f$ is called a non-focal image areas $\overline{S_f}$, which is the image area corresponding to a non-focal plane. The image processor 150 only processes the image on the focal area $S_f$ according to embodiment one and embodiment two disclosed above, does not process the image on the non-focal area $\overline{S_f}$. The image after the above process has a much clear focal area $S_f$. For the non-focal area $\overline{S_f}$, due to the existence of the interference light signal unmodulated by the liquid crystal lenses (e.g. the y component signal), comparing to the non-focal area $\overline{S_f}$, the image captured by an ordinary camera has a much blurred effect.

By analyzing the sharpness of the image, the focal area located at the same focal plane of the specified focus point can be obtained from the in-focus image, and the focal area of the in-focus image is processed based on the image area corresponding to the focal area of the in-focus image in the out-of-focus image. That is to process the focal area $S_f$ according to the equation (6) described in embodiment two, and not to perform any process on the non-focal area $\overline{S_f}$.

Thus, it can ensure that the image area with the same focal plane of the specified focus point is clear. And not to perform any process on other non-focal area maintains the polarized signal unmodulated by the liquid crystal lenses, so that it may produce the much blurred effect on the image than the one captured by the ordinary camera.

Figure 3:
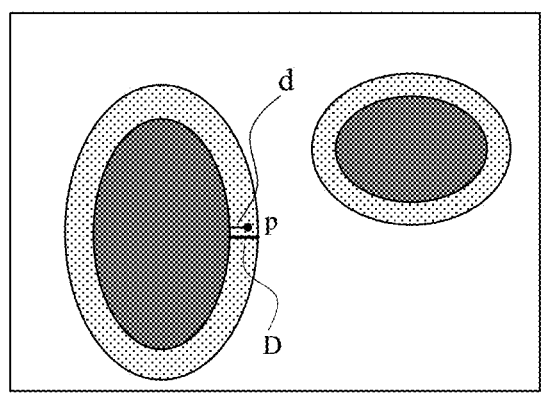
FIG. 3 illustrates another exemplary image with focal image areas, non-focal image areas, and transition areas according to the disclosed embodiments.

And in order to optimize a clear boundary between the focal area $S_f$ and the non-focal area $\overline{S_f}$ in actual shootings as shown in FIG. 2, a transition area $S_t$ is established between the border of the focal area $S_f$ and the border of the non-focal area $\overline{S_f}$, as shown in FIG. 3. And the transition area $S_t$ is processed in the similar way as equation (6), but with a weaker processing intensity or with a processing intensity gradually changing from strong to weak.

In certain embodiments, the transition area is processed in the following equation:

$$\text{normalization}[I_f - \Sigma_{k=1}^n w_k(p) I_k] \quad (11)$$

Where, $I_f$ represents the in-focus image of the transition area, $I_k$ represents the out-of-focus image of the transition area, normalization is the brightness normalization function, n is an integer greater than 1, $0 \le w_k(p) < 1$, $\Sigma_{k=1}^n w_k(p) < 1$, and $w_k(p)$ represents the weighting coefficient of the out-of-focus image $I_k$ of the transition area on a pixel p in the transition area $S_t$. Each pixel has a different weighting coefficient $w_k(p)$.

As certain embodiments, the coefficient $w_k(p)$ of each pixel is inversely proportional to a distance $d(p)$ of the pixel p from the focal area S as indicated in the following equation:

$$w_k(p) = \gamma_k e^{-\lambda_k d(p)/D} \quad (12)$$

where $d(p)/D$ is a normalization function of $d(p)$, representing the normalization process on $d(p)$, which is the maximum value the $d(p)$ can take. The unit of D and dp is the pixel p. D represents a width of the transition area $S_t$. $\gamma_k$ and $\lambda_k$ represent fixed parameters of the out-of-focus image $I_k$ of the transition area. For different $I_k$, $\gamma_k$ and $\lambda_k$ are also different.

Thus, when the image processor 150 processes the transition area $S_t$ in the similar way as the equation (6) described in Embodiment two, the process intensity is weak or is changing gradually from strong to weak. Thus, it may not create a clear boundary between the focal area $S_f$ and the non-focal area $\overline{S_f}$, generating a more natural image.

Further, the processing of the in-focus image using out-of-focus images generated after focus is described below.

When the lens group 130 is in operation, the liquid crystal lenses is driven to the lens state. When the liquid crystal lenses are in focus, the image sensor 140 generates or captures the in-focus image. The image processor 150 receives and analyzes the in-focus image. When the image processor 150 determines that the generated image is the in-focus image, the image processor 150 sends a control signal to the drive circuit 120.

According to the control signal, the drive circuit 120 adjusts the voltage applied on the liquid crystal lenses and drives the liquid crystal lenses to transit from the in-focus state to the out-of-focus state. When the liquid crystal lenses are in the out-of-focus state, the image sensor 140 generates at least one out-of-focus image. These out-of-focus images may be captured or obtained when the liquid crystal lenses are in lens state (working state). These out-of-focus images may also be captured or obtained when the liquid crystal lenses are in non-lens state (non-working state). Thus, the image processor 150 receives the out-of-focus images and the in-focus images, and processes the in-focus image using the out-of-focus images generated after focus. The specific process is identical to the process disclosed in the above three embodiments (i.e. embodiment one, embodiment two and embodiment three), the details may refer to the above descriptions, and are not repeated hereafter.

In another embodiment, the out-of-focus images $I_1, I_2, \ldots, I_n$ may be generated during the out-of-focus state of the liquid crystal lenses before the in-focus image is generated. The out-of-focus images may also be generated during the out-of-focus state of the liquid crystal lenses after the in-focus image is generated. Or part of the out-of-focus images are generated before focus, part of the out-of-focus images are generated after focus, and the image generating order may be determined as required. $W_k$ and $w_k(p)$ may also be adjusted freely according to the actual shooting needs. The rest are the same as above, and the details are not repeated.

Figure 4:
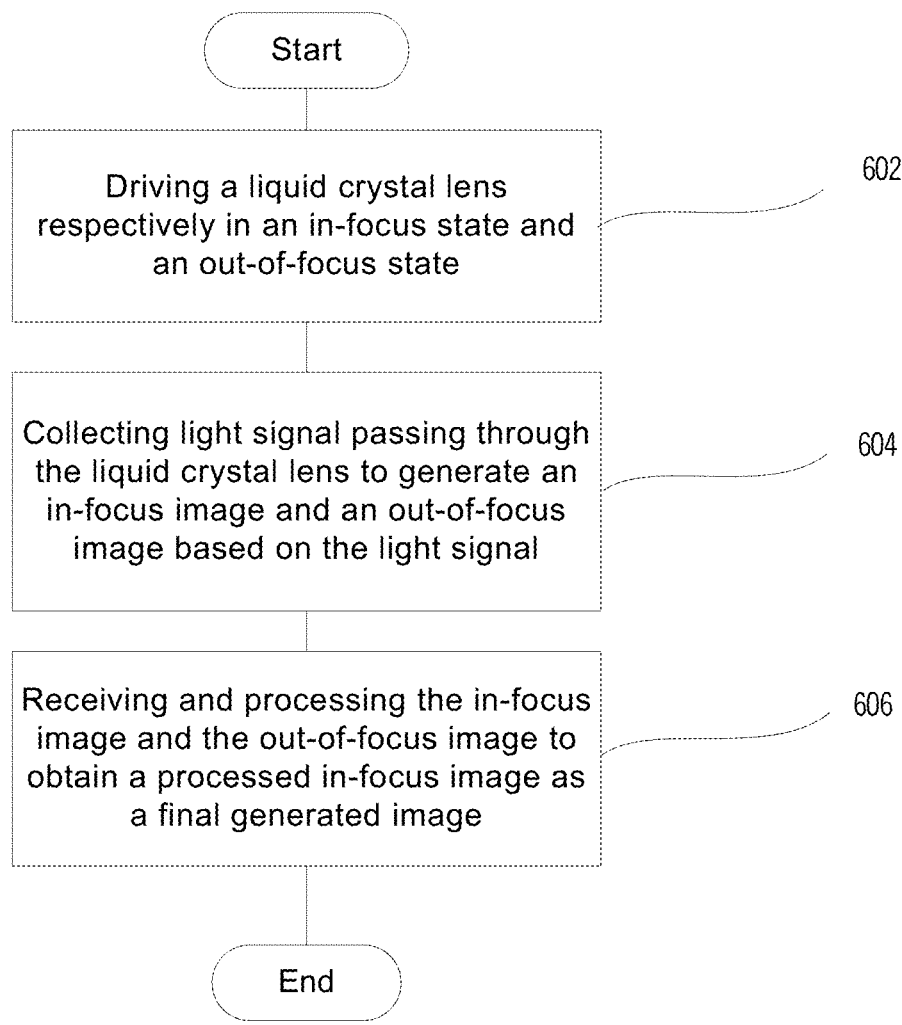
FIG. 4 illustrates a flow chart of a liquid crystal lens imaging method according to the disclosed embodiments.

FIG. 4 illustrates a flow chart of a liquid crystal lens imaging method according to the disclosed embodiments. As shown in FIG. 4, the liquid crystal lens imaging method comprises the following steps.

Step 602, the liquid crystal lenses are driven to be in in-focus state and out-of-focus state respectively.

Step 604, the light signal passing through the liquid crystal lenses is collected to generate an image. When the liquid crystal lenses are in in-focus state, the light signal generates an in-focus image. And when the liquid crystal lenses are in out-of-focus state, the light signal generates an out-of-focus image.

Step 606, the in-focus image and the out-of-focus image are received and processed to obtain a processed in-focus image as a final generated image.

Thus, especially when without using a polarizing device, the liquid crystal lens imaging apparatus can reduce the thickness of the device structure, making the system more compact. And in order to still obtain high quality image especially when without using the polarizing device, based on above disclosed methods, the liquid crystal lens imaging apparatus also obtains one or multiple out-of-focus images in the out-of-focus state before or after focus, in addition to obtaining the in-focus image generated when the liquid crystal lenses are in stable in-focus state. The disclosed liquid crystal lens imaging apparatus processes the in-focus image using the out-of-focus images, with the help of the out-of-focus images, to generate the final clear in-focus image, reducing the impact of not using the polarizing device to generate the image. Thus, especially when without using the polarizing device, the liquid crystal lens imaging apparatus reduces the thickness of the device structure, making the system more compact.

According to any one of the technical solutions disclosed above, preferably, processing the in-focus image and the out-of-focus images to obtain the processed in-focus image as the final generated image specifically includes using the out-of-focus images to weaken or remove the image generated by the interference light signal unmodulated by the liquid crystal lenses in the in-focus image. Since the interference signal of the in-focus image is weakened or removed, the generated image has a much higher contrast.

According to any one of the technical solutions disclosed above, preferably, processing the in-focus image and the out-of-focus images to obtain the processed in-focus image as the final generated image also includes using images generated by the light signal modulated by the liquid crystal lenses in the out-of-focus images to process images generated by the light signal modulated by the liquid crystal lenses in the in-focus image.

Because using the images generated by the light signal modulated by the liquid crystal lenses in the out-of-focus images to process sub-images generated by the light signal modulated by the liquid crystal lenses in the in-focus image is equivalent to a high-pass filtering process, i.e., an Unsharp Masking process, so the final generated image is much sharper and with higher contrast.

According to any one of the technical solutions disclosed above, preferably, the liquid crystal lens imaging method also includes adjusting the brightness of the final generated image. After the image processing, it may cause energy loss of the image. By adjusting the brightness, the image energy can be improved and to be recovered to its normal energy level.

According to any one of the technical solutions disclosed above, preferably, that processing the out-of-focus images and the in-focus images to obtain the processed in-focus image as the final generated image is to use the out-of-focus images to process the in-focus image based on the following equation to obtain the final clear image L under the condition that there is no change occurred for the incident light L or the changes is minor enough to be ignored.

$$I_s = \text{normalization}[I_f - \psi(I_1, \ldots, I_n)] \quad (13)$$

Where normalization is a brightness normalization function, $I_f$ represents the in-focus image, $I_1, I_2, \ldots, I_n$ represents multiple out-of-focus images detected and generated by the image sensor arranged in chronological order during a transition from the out-of-focus state to the in-focus state, n is an integer greater than 1, and $I_f - \psi(I_1, \ldots, I_n)$ represents the use of at least an out-of-focus image to process the in-focus image.

In certain embodiments, $\psi(I_1, \ldots, I_n)$ satisfies the following equation.

$$\psi(I_1, \ldots, I_n) = \Sigma_{k=1}^{n} w_k I_k \quad (14)$$

Where $w_k$ represents a weighting coefficient of an out-of-focus image $I_k$, $0 \le w_k < 1$, $\Sigma_{k=1}^{n} w_k < 1$, and $w_k$ increases with the increase of k value.

In actual image shootings, $w_k$ may be adjusted according to the out-of-focus image $I_k$. When shooting a still scene, $w_k$ of a smaller k value is set to a bigger value. And with the increase of k value, $w_k$ value decreases. Thus, a much clear out-of-focus image can be obtained. When shooting a sports scene, $w_k$ of a smaller k value is set to a smaller value. And with the increase of k value, $w_k$ increases. Thus, ghost images caused by movement can be reduced.

Further, the brightness normalization function satisfies the following equation:

$$\text{normalization}[x] = x/[1 - \Sigma_{k=1}^{n} w_k] \quad (15)$$

Together with equation 14 and 15, equation 13 can be converted to the following equation:

$$I_s = [I_f - \Sigma_{k=1}^{n} w_k I_k]/[1 - \Sigma_{k=1}^{n} w_k] \quad (16)$$

According to any one of the technical solutions disclosed above, when the in-focus image is generated based on a specified focus point, a focal area located at a same focal plane of the specified focus point in the in-focus image is obtained by analyzing the sharpness of the image, and the focal area of the in-focus image is processed by using an image area corresponding to the focal area of the in-focus image in the out-of-focus images.

Such processing can ensure that the image area located at the same focal plane of the specified focus point is clear, and not to process other non-focal area maintains the polarized signal unmodulated by the liquid crystal lenses. Thus, it may produce a much blurred effect on the image than the one captured by an ordinary camera.

According to any one of the technical solutions disclosed above, a transition area is established between the focal area of the in-focus image and the non-focal area of the out-of-focus images, and the transition area of the in-focus image is processed by using the image area corresponding to the transition area of the in-focus image in the out-of-focus images.

The specific process described above for the focal area $S_f$ and the transition area $S_t$ is identical to the process described in embodiment three, so the details are not repeated. Since the process of the transition area is similar to the process of the focal area, but the process intensity is weaker or gradually changes from strong to weak, therefore it may not create a clear boundary between the focal area and the non-focal area, generating a more natural image.

Since the liquid crystal lens imaging method according to the present invention does not add or use the polarizing device, so that the intensity of incident light is fully preserved or maintained, further enriches the detail of the image shot or captured in low light environment. And the clear image can be generated using a single liquid crystal lens, reducing the thickness of the liquid crystal lens structure, making the entire system more compact.

Further, it should be noted that, although the description of the present invention sometimes describes the out-of-focus images first and then describes the in-focus image afterwards, and sometimes describes the in-focus image first and then describes the out-of-focus images afterwards, it is only for better understanding and explaining more intuitively and clearly the principle of the present invention together with specific circumstances, it does not represent or indicate any chronological order on the generating of the out-of-focus images and the in-focus image (or the in-focus image and the out-of-focus images). In fact, as described above, the images generated in out-of-focus state before and after focus state may be referred to as the out-of-focus images. And in practice, the in-focus image and the out-of-focus state are related to a predetermined judging standard. So the "out-of-focus images", "in-focus image" and "out-of-focus state", "in-focus state" are all relative terms. Thus, any processing method of the "in-focus image" (i.e. target image) generated by the liquid crystal lenses in "in-focus state" by using the "out-of-focus images" (i.e. auxiliary images) generated by the liquid crystal lenses in "out-of-focus state", regardless of the generating sequence of the "out-of-focus images" and the "in-focus image", should fall within the protection scope of the present invention. In addition, the incident light entering the lens group 130 may be also light with single-direction polarization.

The above only describes certain embodiments of the present invention, it does not constitute any limit to the present invention. For those skilled in the art, the present invention may have various modifications and changes, such as processing the in-focus image through the use of the out-of-focus images generated after focus state. Within the spirit and principles of the present invention, any modifications, equivalent replacement, and improvement, etc., should be included within the protection scope of the present invention.

INDUSTRIAL APPLICABILITY AND ADVANTAGEOUS EFFECTS

Without limiting the scope of any claim and/or the specification, examples of industrial applicability and certain advantageous effects of the disclosed embodiments are listed for illustrative purposes. Various alternations, modifications, or equivalents to the technical solutions of the disclosed embodiments can be obvious to those skilled in the art and can be included in this disclosure.

According to the disclosed embodiments of the present invention, especially when without using a polarizing device, the intensity of incident light is fully preserved or maintained, which further enriches the detail of image shot or captured in low light environment. And a clear image can be generated using a single liquid crystal lens, reducing the thickness of the liquid crystal lens structure, making the entire system more compact. The incident light can have multiple polarizing directions or can have a single polarizing direction.

What is claimed is:

1. A liquid crystal lens imaging apparatus, comprising:
    a lens group including at least a liquid crystal lens;
    a drive circuit connected to the liquid crystal lens to drive the liquid crystal lens either into an out-of-focus state or into an in-focus state;
    an image sensor configured to collect light signal passing through the lens group and to generate an image according to the light signal, wherein, when the liquid crystal lens is in the in-focus state, the image sensor generates an in-focus image of the light signal and, when the liquid crystal lens is in the out-of-focus state, the image sensor generates at least one out-of-focus image of the light signal; and
    an image processor connected to the image sensor, and configured to receive both the in-focus image and the at least one out-of-focus image and to process the in-focus image using the at least one out-of-focus image to weaken an image generated by interference light signal that is unmodulated by the liquid crystal lens in the in-focus image, such that a processed high-contrast in-focus image as a final generated image is obtained.

2. The liquid crystal lens imaging apparatus according to claim 1, wherein, to process the in-focus image using the at least one out-of-focus image to weaken an image generated by interference light signal that is unmodulated by the liquid crystal lens in the in-focus image, the image processor is further configured to:
    use an image generated by the light signal modulated by the liquid crystal lens in the out-of-focus images to process an image generated by the light signal modulated by the liquid crystal lens in the at least one in-focus image.

3. The liquid crystal lens imaging apparatus according to claim 2, wherein the image processor is further configured to adjust brightness of the final generated image.

4. The liquid crystal lens imaging apparatus according to claim 1, wherein the image processor is configured to process the in-focus image using the at least one out-of-focus image to weaken an image generated by interference light signal that is unmodulated by the liquid crystal lens in the in-focus image is based on:

$$I_s = \text{normalization}[I_f - \psi(I_1, \ldots, I_n)]$$

wherein, $I_S$ represents the final generated image, $I_f$ represents the in-focus image, $I_n$ represents an out-of-focus image, n is an integer greater than or equal to 1, normalization is a brightness normalization function, and $I_f - \psi(I_1, \ldots, I_n)$ represents the processing of the in-focus image using at least an out-of-focus image.

5. The liquid crystal lens imaging apparatus according to claim 4, wherein $\psi(I_1, \ldots, I_n)$ satisfies the following equation:

$$\psi(I_1, \ldots, I_n) = \Sigma_{k=1}^{n} w_k I_k$$

wherein, wk represents a weighting coefficient of the out-of-focus image Ik, $0 \leq w_k < 1, \Sigma_{k=1}^{n} w_k < 1$.

6. The liquid crystal lens imaging apparatus according to claim 5, wherein, the brightness normalization function normalization satisfies the following equation:

$$\text{normalization}[I_f - \psi(I_1, \ldots, I_n)] = [I_f - \psi(I_1, \ldots, I_n)] / [1 - \Sigma_{k=1}^{n} w_k].$$

7. The liquid crystal lens imaging apparatus according to claim 1, wherein a time interval between the out-of-focus state of the liquid crystal lens corresponding to the out-of-focus image and the in-focus state of the liquid crystal lens corresponding to the in-focus image is less than a preset time.

8. The liquid crystal lens imaging apparatus according to claim 1, further comprising an optical lens coupled with the liquid crystal lens.

9. The liquid crystal lens imaging apparatus according to claim 8, wherein the lens group includes multiple liquid crystal lenses, and initial alignment of the multiple liquid crystal lenses parallel to each other.

10. The liquid crystal lens imaging apparatus according to claim 1, wherein, when the in-focus image is generated based on a specified focus point, the image processor determines or analyzes based on sharpness of the in-focus image to obtain a focal area located at a same focal plane of the specified focus point, and to process the focal area of the in-focus image using an image area corresponding to the focal area of the in-focus image in the out-of-focus image.

11. The liquid crystal lens imaging apparatus according to claim 10, wherein, the image processor establishes a transition area between the focal area of the in-focus image and a non-focal area outside the focal area, and processes the transition area of the in-focus image using an image area corresponding to the transition area of the in-focus image in the out-of-focus image.

12. A liquid crystal lens imaging method, comprising:
    driving a liquid crystal lens respectively into an out-of-focus state or into an in-focus state;
    collecting light signal passing through the liquid crystal lens by an image sensor to generate an image according to the light signal, wherein, when the liquid crystal lens is in the in-focus state, the image sensor generates an in-focus image of the light signal and, when the liquid crystal lens is in the out-of-focus state, the image sensor generates at least one out-of-focus image of the light signal; and
    receiving both the in-focus image and the at least one out-of-focus image by an image processor and processing the in-focus image using the at least one out-of-focus image to weaken an image generated by interference light signal that is unmodulated by the liquid crystal lens in the in-focus image, such that a processed in-focus image as a final generated image is obtained.

13. The liquid crystal lens imaging method according to claim 12, wherein processing the in-focus image using the at least one out-of-focus image to weaken an image generated by interference light signal that is unmodulated by the liquid crystal lens in the in-focus image further includes:
    processing an image generated by the light signal modulated by the liquid crystal lens in the in-focus image using an image generated by the light signal modulated by the liquid crystal lens in the at least one out-of-focus image.

14. The liquid crystal lens imaging method according to claim 12, further comprising:
    adjusting the brightness of the final generated image.

15. The liquid crystal lens imaging method according to claim 12, wherein processing the in-focus image using the at least one out-of-focus image to weaken an image generated by interference light signal that is unmodulated by the liquid crystal lens in the in-focus image, such that a processed in-focus image as a final generated image is obtained is based on:

$$I_s = [I_f - \Sigma_{k=1}^{n} w_k I_k]/[1 - \Sigma_{k=1}^{n} w_k]$$

wherein, $I_s$ represents the final generated image, $I_f$ represents the in-focus image, $I_k$ represents an out-of-focus image, n is an integer greater than 1, $w_k$ represents a weighting coefficient of the in-focus image, and $0 \leq w_k < 1, \Sigma_{k=1}^{n} w_k < 1$.

16. The liquid crystal lens imaging method according to claim 12, further comprising:
    when the in-focus image is generated based on a specified focus point, determining the in-focus image according to sharpness of the image to obtain a focal area located at a same focal plane of the specified focus point, and processing the focal area of the in-focus image using an image area corresponding to the focal area of the in-focus image in the out-of-focus image.

17. The liquid crystal lens imaging method according to claim 16, further comprising:
    establishing a transition area between the focal area of the in-focus image and a non-focal area outside the focal area, and processing the transition area of the in-focus image using an imaging area corresponding to the transition area of the in-focus image in the out-of-focus image.

* * * * *